(12) United States Patent
Pradhan et al.

(10) Patent No.: US 11,900,781 B2
(45) Date of Patent: *Feb. 13, 2024

(54) AUTO-CONFIGURABLE MOTION/OCCUPANCY SENSOR (71) Applicant: Ecolink Intelligent Technology, Inc., Carlsbad, CA (US)

(72) Inventors: Ashish Pradhan, Carlsbad, CA (US); George Seelman, Temecula, CA (US); Brandon Gruber, Carlsbad, CA (US); Shing Chen, Carlsbad, CA (US); Michael Bailey, Carlsbad, CA (US)

(73) Assignee: Ecolink Intelligent Technology, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/578,112

(22) Filed: Jan. 18, 2022

(65) Prior Publication Data

US 2022/0139189 A1    May 5, 2022

Related U.S. Application Data (62) Division of application No. 16/352,382, filed on Mar. 13, 2019, now Pat. No. 11,227,476.

(51) Int. Cl.
*G08B 21/04* (2006.01)
*G05B 15/02* (2006.01)
*G01P 13/00* (2006.01)

(52) U.S. Cl.
CPC .......... *G08B 21/0469* (2013.01); *G01P 13/00* (2013.01); *G05B 15/02* (2013.01); *G05B 2219/2642* (2013.01)

(58) Field of Classification Search
CPC . G01P 13/00; G05B 15/02; G05B 2219/2642; G08B 21/0469; G08B 13/19; G08B 21/22
See application file for complete search history.

(56) References Cited

U.S. PATENT DOCUMENTS

| 5,196,826 | A | 3/1993 | Whiting |
| 5,344,068 | A | 9/1994 | Haessig |
| 5,543,778 | A * | 8/1996 | Stouffer ............... G08B 25/10 340/425.5 |
| 5,903,217 | A | 5/1999 | Stanczak et al. |
| 5,986,357 | A | 11/1999 | Myron et al. |
| 6,057,764 | A | 5/2000 | Williams |
| 6,850,159 | B1 | 2/2005 | Mudge |
| 6,909,921 | B1 * | 6/2005 | Bilger ................ G08B 21/0492 700/63 |
| 7,411,789 | B2 | 8/2008 | Elwell et al. |

(Continued)

FOREIGN PATENT DOCUMENTS

WO     2018141946 A1    8/2018

OTHER PUBLICATIONS

EPO, extended European search report issued on European patent application No. 20770681.3, dated Nov. 7, 2022, 7 pages.

(Continued)

*Primary Examiner* — Zhipeng Wang
(74) *Attorney, Agent, or Firm* — Greenberg Traurig, LLP (57) ABSTRACT A person-detection device that automatically configures itself as a motion sensor or an occupancy sensor upon receiving a command from a home security panel or home automation hub.

18 Claims, 4 Drawing Sheets

(56) References Cited

U.S. PATENT DOCUMENTS

| | | | |
|---|---|---|---|
| 7,873,849 B2 | 1/2011 | Mucignat et al. | |
| 8,665,090 B2 | 3/2014 | Bull | |
| 8,842,008 B2 | 9/2014 | Bull | |
| 9,589,446 B1 | 3/2017 | Dey | |
| 9,615,428 B2 | 4/2017 | King | |
| 9,756,607 B1 | 9/2017 | DeLuca | |
| 9,836,069 B1 | 12/2017 | Nelmes et al. | |
| 10,354,503 B1* | 7/2019 | Kostrun | H05B 47/115 |
| 10,492,261 B2 | 11/2019 | Chen | |
| 10,557,965 B2* | 2/2020 | Lemarchand | G01S 7/484 |
| 10,650,652 B1 | 5/2020 | Weingart et al. | |
| 10,937,257 B2 | 3/2021 | Davidson et al. | |
| 11,227,476 B2 | 1/2022 | Pradhan et al. | |
| 11,232,685 B1 | 1/2022 | Nixon | |
| 2002/0067272 A1 | 6/2002 | Lemelson et al. | |
| 2002/0089489 A1 | 7/2002 | Carpenter | |
| 2002/0175815 A1 | 11/2002 | Baldwin | |
| 2004/0090327 A1 | 5/2004 | Soloway | |
| 2005/0228317 A1 | 10/2005 | Mathews | |
| 2008/0291036 A1* | 11/2008 | Richmond | G08B 19/005 340/628 |
| 2009/0086683 A1 | 4/2009 | Pendergrass et al. | |
| 2009/0146846 A1 | 6/2009 | Grossman | |
| 2009/0196206 A1 | 8/2009 | Weaver et al. | |
| 2010/0019911 A1 | 1/2010 | Chen | |
| 2012/0019644 A1 | 1/2012 | Hamabashiri et al. | |
| 2012/0023354 A1* | 1/2012 | Chino | G01P 15/00 713/323 |
| 2012/0297226 A1 | 11/2012 | Mucignat et al. | |
| 2012/0315839 A1 | 12/2012 | Mumcuoglu et al. | |
| 2013/0267253 A1 | 10/2013 | Case et al. | |
| 2014/0118592 A1 | 5/2014 | Yoon et al. | |
| 2014/0191862 A1 | 7/2014 | Haines | |
| 2015/0113338 A1 | 4/2015 | Maruyama et al. | |
| 2015/0308706 A1* | 10/2015 | Bunker | F24F 11/38 700/275 |
| 2016/0003493 A1* | 1/2016 | Katz | F24F 11/46 700/275 |
| 2016/0095192 A1* | 3/2016 | Vangeel | F24F 11/58 315/153 |
| 2016/0126733 A1* | 5/2016 | Hick | H05B 47/11 700/295 |
| 2016/0150121 A1 | 5/2016 | Idehara | |
| 2016/0241997 A1 | 8/2016 | Lucas | |
| 2017/0013069 A1 | 1/2017 | Grohman | |
| 2017/0039844 A1* | 2/2017 | Malhotra | G08B 29/185 |
| 2017/0060960 A1 | 3/2017 | Kim et al. | |
| 2017/0092112 A1* | 3/2017 | Khazanov | G08B 25/008 |
| 2017/0160428 A1 | 6/2017 | Kumar | |
| 2017/0181249 A1 | 6/2017 | Takahashi | |
| 2017/0316680 A1 | 11/2017 | Lamb et al. | |
| 2017/0358182 A1 | 12/2017 | El-Iraki et al. | |
| 2018/0012467 A1 | 1/2018 | Chen | |
| 2018/0074152 A1 | 3/2018 | Bowden | |
| 2018/0322752 A1 | 11/2018 | Chen | |
| 2018/0338472 A1 | 11/2018 | Kinsley et al. | |
| 2019/0141812 A1* | 5/2019 | Chen | H05B 45/20 |
| 2019/0293315 A1* | 9/2019 | Ruiz | F24F 11/56 |
| 2020/0209943 A1 | 7/2020 | Gruber et al. | |
| 2020/0211340 A1* | 7/2020 | Min | G01S 13/886 |
| 2020/0294382 A1 | 9/2020 | Pradhan et al. | |
| 2023/0029713 A1 | 2/2023 | Gruber et al. | |

OTHER PUBLICATIONS

ISA/US, Int. Search Report and Written Opinion issued on PCT application No. PCT/US19/57130, dated Jan. 16, 2020, 10 pages.

ISA/US, Int. Search Report and Written Opinion issued on PCT application No. PCT/US17/54706, dated Oct. 19, 2017, 9 pages.

ISA/US, Int. Search Report and Written Opinion issued on PCT application No. PCT/US21/19185, dated Mar. 26, 2021, 7 pages.

ISA/US, Int. Search Report and Written Opinion issued on PCT application No. PCT/US20/21177, dated Jun. 15, 2020, 13 pages.

U.S. Patent and Trademark Office, Non-Final Office Action issued in U.S. Appl. No. 17/963,708, dated Feb. 16, 2023, 11 pgs.

Non-final Office Action from U.S. Appl. No. 17/393,928, dated May 25, 2023, 13 pp.

Extended Search Report from European application No. 21765088.6, dated Jun. 28, 2023, 7 pp.

Notice of Allowance from U.S. Appl. No. 17/963,708, dated Jul. 25, 2023, 9 pp.

International Search Report and Written Opinion issued on PCT application No. US22/37533, dated Aug. 16, 2022, 8 pages.

Office Action from European application No. 20770681.3, dated Aug. 21, 2023, 7 pp.

Office Action from European application No. 19907204.2, dated Aug. 22, 2023, 6 pp.

Final Office Action from U.S. Appl. No. 17/393,928, dated Sep. 13, 2023, 13 pp.

\* cited by examiner

AUTO-CONFIGURABLE MOTION/OCCUPANCY SENSOR

CROSS-REFERENCE TO RELATED APPLICATIONS

The present application is a divisional of U.S. patent application Ser. No. 16/352,382, filed on Mar. 13, 2019.

BACKGROUND

II. Field of the Invention

The present invention relates to home automation and home security and, more particularly, to a sensor that can automatically be configured to act as a motion sensor or an occupancy sensor.

II. Description of Related Art

Home security systems are very popular in the United States and abroad. Such home security systems typically comprise a security panel and a number of sensors distributed around the home to detect unauthorized entry and/or movement inside the home. For example, a home may have all of its doors and windows monitored by installing a wireless door/window sensor onto each door and window of the home to detect unauthorized entry, and one or more motion sensors installed at one or more points inside the home for detecting unauthorized movement within the home. Each of the sensors may transmit a wireless signal to the security panel, where the security panel may take further action once a signal has been received from one of the sensors, such as to sound a siren inside the home or contact a remote monitoring facility.

In addition to the popularity of home security systems, home monitoring and control systems are now becoming widespread. Such systems allow users to monitor their home security systems, turn lights on and off remotely, lock and unlock doors remotely, as well as to better control home heating and air conditioning systems. In the latter category, battery-powered, home occupancy sensors are being used to automatically control operation of heating and air conditioning systems when the sensors detect the presence of an occupant or not.

Occupancy sensors may suffer from greater battery drainage than motion sensors, due to the fact that occupancy sensors transmit a signal every time occupancy is sensed. In contrast, motion sensors typically limit the number of transmissions by using a preset "dwell time", usually on the order of between three and four minutes, that restricts transmission to once per dwell time. Thus, the batteries in motion sensors tend to last longer than batteries in occupancy sensors. This problem is exacerbated when an occupancy sensor is placed in a high-traffic area, such as an entry hallway or kitchen, for example. While battery life is usually better for motion sensors, a tradeoff occurs between battery life and an accurate ability to know when a person is present or not.

Given that both motion sensors and occupancy sensors determine the presence of people and given the expense to purchase both types of sensors, it might be desirable to use a motion sensor as a dual-purpose sensor: a security motion sensor and an occupancy sensor. However, given the relatively long dwell time of motion sensors, accurate occupancy determinations may suffer, as the dwell time prevents occupancy updates on a continuous basis.

It would be desirable, then, to combine traditional, battery-powered motion sensors with occupancy sensors to eliminate the need to purchase both types of sensors, and to reduce the number of battery-powered devices in a home.

SUMMARY

A system, method and apparatus for detecting motion and occupancy of a person in an area. In one embodiment, a method is described, performed by a person detection device (PDD), the method comprising operating, by the processor, the PDD in a motion sensor mode of operation, receiving, by the processor via a transceiver coupled to the processor, a command to change a mode of operation of the PDD, in response to receiving the command, configuring, by the processor, the PDD to operate in an occupancy sensor mode of operation, and operating, by the processor, the PDD in the occupancy sensor mode of operation.

In another embodiment, a person detection device (PDD) is described for detecting motion and occupancy of a person in an area, comprising a memory for storing processor-executable instructions, a transceiver for sending and receiving wireless signals, a processor coupled to the detector, the memory and the transceiver, for executing the processor-executable instructions that causes the apparatus to operate, by the processor, the PDD in a motion sensor mode of operation, receive, by the processor via the transceiver, a command to change a mode of operation of the PDD, in response to receiving the command, configure, by the processor, the PDD to operate in an occupancy sensor mode of operation, and operate, by the processor, the PDD in the occupancy sensor mode of operation.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION

This disclosure describes a person detection device (PDD) configured to act as either a security motion sensor or a home automation occupancy sensor. The PDD automatically switches between operating in a motion sensor state and an occupancy state in response to receiving signals from a remote source, such as a security panel or a home automation hub, or both. In some embodiments, a single sensor inside the PDD detects both movement (of a person) and occupancy of an area being monitored by the PDD. In other embodiments, two sensors may be used, one for detecting movement and the other for detecting occupancy.

Figure 1:
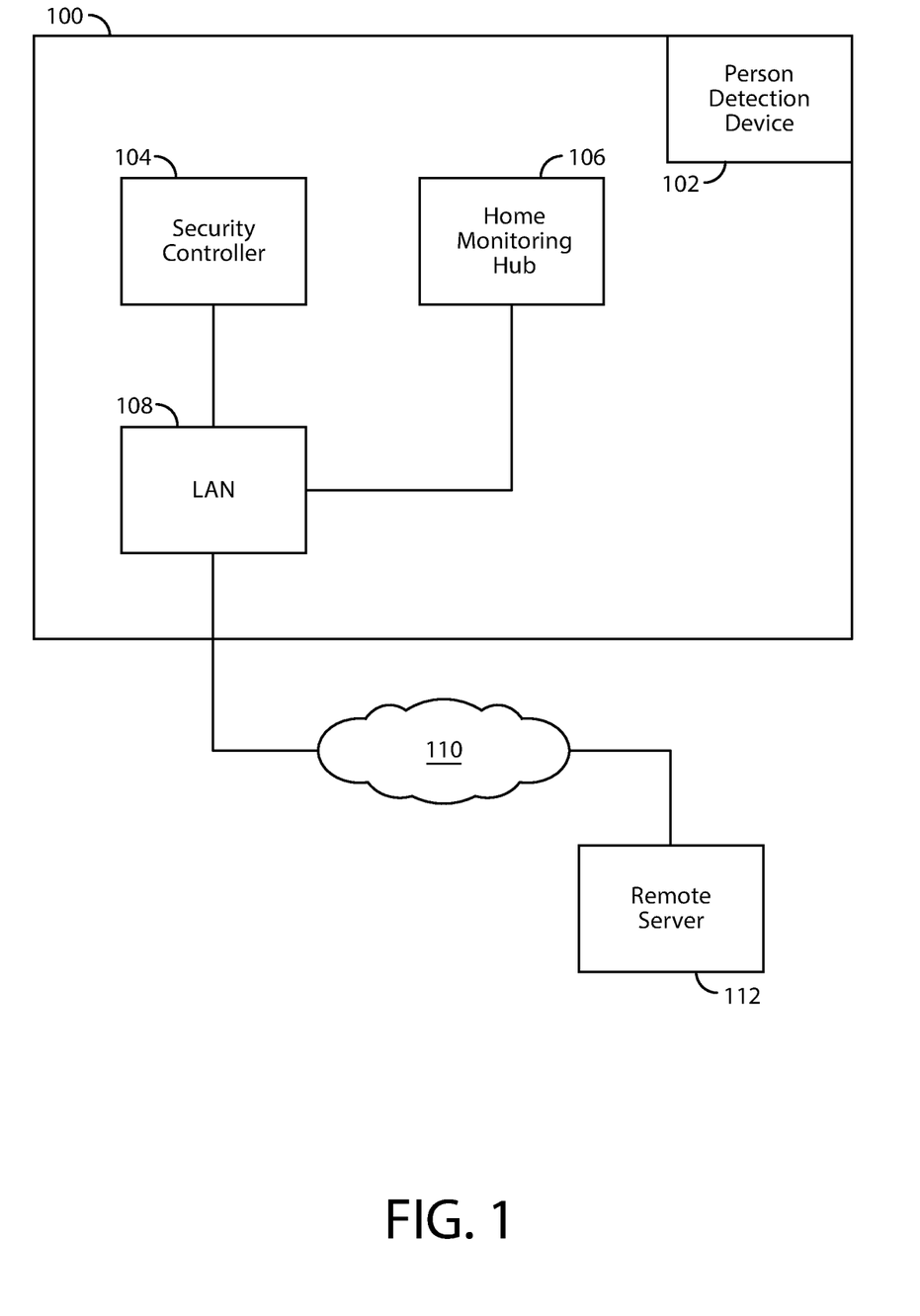
FIG. 1 illustrates one embodiment of a system for detecting motion and occupancy of a person in an area.

FIG. 1 illustrates a top, plan view of a premises 100 for monitoring by PDD 102. Premises 100 may comprise a home or a business and one or more PDDs 102 may be installed to determine motion and occupancy occurring generally inside premises 100, or in a particular area inside premises 100, such as an entry way, hallway, room, etc. PDD 102 is typically battery-powered using a single, passive infra-red (PIR) detection inside to detect infra-red heat as a person moves across an area monitored by PDD 102. PDD 102 may, alternatively or in combination, comprise a secondary sensor, such as one or more thermopiles, or thermopile arrays, as will be discussed in greater detail later herein, to determine if a person is occupying an area being monitored by PDD 102. Unlike traditional motion (PIR) sensors, occupancy sensors generally do not require movement of a person in order to detect their presence.

When motion or occupancy is detected, depending on the mode of operation that PDD 102 is operating in, PDD 102 transmits a signal indicative of the presence of a person, referred to herein as a person-present signal, to one or more remote devices, such as to security controller or hub 104 and/or to home automation and monitoring controller or hub 106 (herein, "home automation hub 106"). In another embodiment, PDD 102 transmits a "motion-detected" signal while operating in the motion sensor mode of operation, and an area-occupied signal when occupancy is detected while operating in an occupancy mode of operation. In one embodiment, the motion-detected signal is transmitted to security controller 104 and the area-occupied signal is transmitted to home automation and monitoring hub 106. Security controller 104 comprises a home security panel, gateway, hub or some other device that monitors PDD 102, as well as other sensors and/or home monitoring and control devices, installed within premises 100 or other areas of a home or business. Examples of security controller 104 include a GC3 Security & Control panel sold by Nortek Security and Control, Inc., a base station sold as part of an alarm security kit by Ring, Inc., a Pulse® interactive touch screen panel sold by ADT, Inc. In other embodiments, security controller 104 may not be used. In these embodiments, PDD 102 is monitored by a remote server 112 in communication with PDD 102 via a wide-area network 110, such as the Internet, and a local-area network (LAN) 108. LAN 108 comprises a wireless router that communicates directly with PDD 102. In the remaining disclosure, any reference to security controller 104 may include reference to remote server 112. In some embodiments, security controller 104 comprises both security and home automation and monitoring functionality.

When security controller 104 receives a person-present or motion-detected signal from PDD 102, security controller 104 may perform one or more actions, such as to contact a remote, security monitoring facility (not shown) via LAN 108 and wide-area network 110, or by some other means, such as via cellular communication technology. Alternatively, or in addition, security controller 104 may cause a siren (not shown) inside of area 100, or elsewhere in another location inside a home or business, to sound, and/or a strobe light (not shown) to flash.

Home automation and monitoring hub 106 comprises a panel, gateway, hub or some other device that monitors PDD 102 for a person-detect signal or area-occupied signal, in order to control one or more other devices or systems within premises 100, such as remote-controlled HVAC, lights, home entertainment systems, etc. Examples of home automation hub 106 include a Samsung® SmartThings® home automation system, an Amazon® Echo® smart hub, etc. Wink® home automation hub. In other embodiments, home automation hub 106 may not be used. In these embodiments, PDD 102 is monitored by a remote server 112 in communication with PDD 102 via wide-area network 110 and LAN 108. In the remaining disclosure, any reference to home automation hub 106 may include reference to remote server 112. In some embodiments, home automation hub 106 comprises both security and home automation and monitoring functionality.

PDD 102 may be instructed to change its operating mode upon receipt of commands sent by security controller 104 and/or home automation hub 106. For example, when one or more persons are within premises 100, PDD 102 may be instructed to operate as an occupancy sensor and when premises 100 is unoccupied, PDD 102 may be instructed to operate as a security motion sensor. Further details of these operations are described in greater detail, below.

Figure 2:
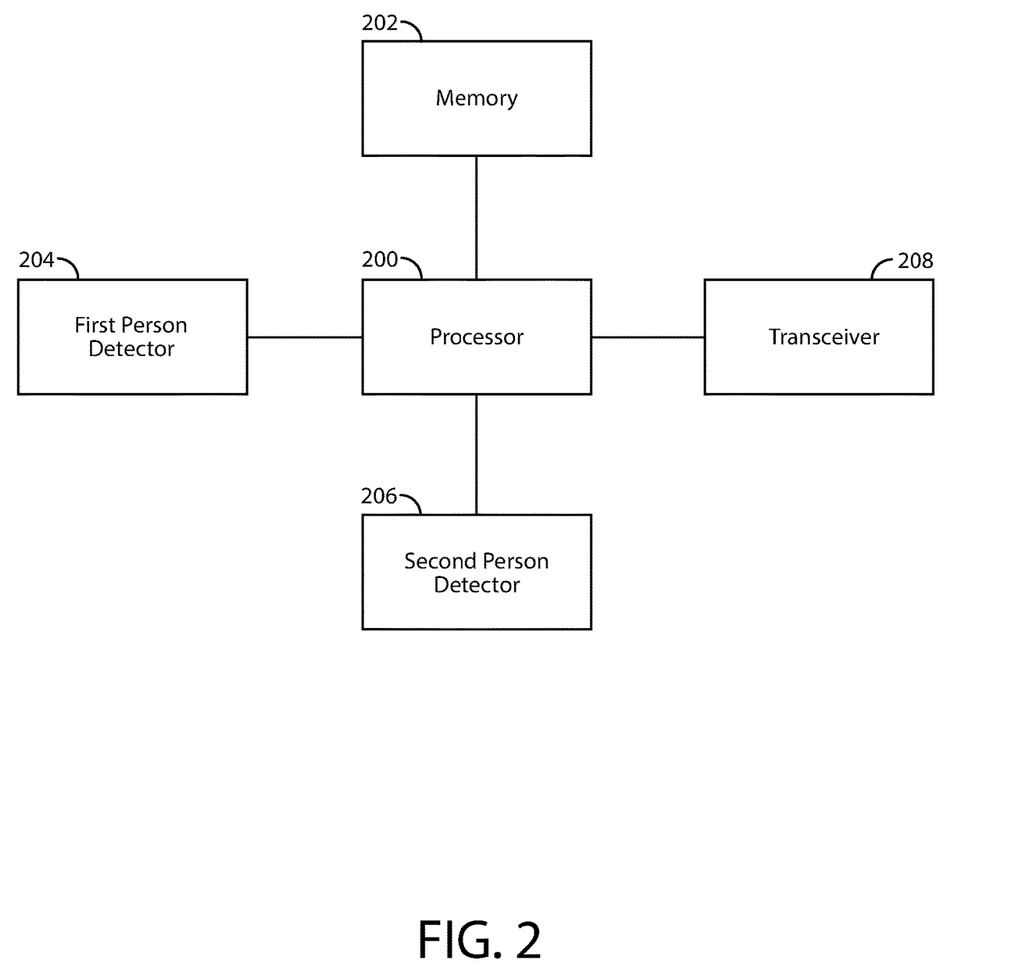
FIG. 2 is a functional block diagram of the person detection device as shown in FIG. 1.

FIG. 2 is a functional block diagram of one embodiment of PDD 102. In this embodiment, PDD 102 comprises a processor 200, a memory 202, a first person sensor 204, a second person sensor 206, and a transceiver 208. It should be understood that the functional blocks shown in FIG. 2 may be connected to one another in a variety of ways, that additional function blocks may be used (for example, amplification or filtering), and that not all functional blocks necessary for operation of PDD 102 are shown for purposes of clarity, such as a power supply.

Processor 200 is configured to provide general operation of PDD 102 by executing processor-executable instructions stored in memory 202, for example, executable code. Processor 200 typically comprises a microcontroller, such as an ADuC7024 analog microcontroller manufactured by Analog Devices, Inc. of Norwood Massachusetts, although any one of a variety of microprocessors, microcomputers, and/or custom ASICs could be used in the alternative, selected based on size, cost, power consumption, computing power, and/or other factors.

Memory 202 is coupled to processor 200 and comprises one or more non-transitory, information storage devices, such as RAM, ROM, flash memory, or virtually any other type of electronic, optical, or mechanical information storage device. Memory 202 is used to store the processor-executable instructions for operation of PDD 102 as well as any information used by processor 200, such as a dwell time that defines how often PDD 102 may transmit when motion or occupancy is detected. Memory device 202 could, alternatively or in addition, be part of processor 200, as in the case of a microcontroller comprising on-board memory.

First person sensor 204 is coupled to processor 200 and comprises a sensor and related circuitry and, in some embodiments, firmware, to detect movement of a person within a range of PDD 102 and/or occupancy of an area monitored by PDD 102. In another embodiment, first person sensor 204 is configured to only detect movement of a person. First person sensor 204 may comprise one or more passive infra-red (PIR) detectors for detecting movement of an infra-red emitting body, such as a person), ultrasonic detectors (for detecting a doppler shift from a reflected body), heat or thermal detectors (for determining a temperature change), carbon dioxide sensors (for detecting the presence of carbon dioxide), microwave sensors (for detecting a doppler shift from a reflected body), a keycard detector (for determining when a hotel guest has inserted a hotel key card), and/or a camera (using firmware to detect a shape in the form of a person).

Figure 3:
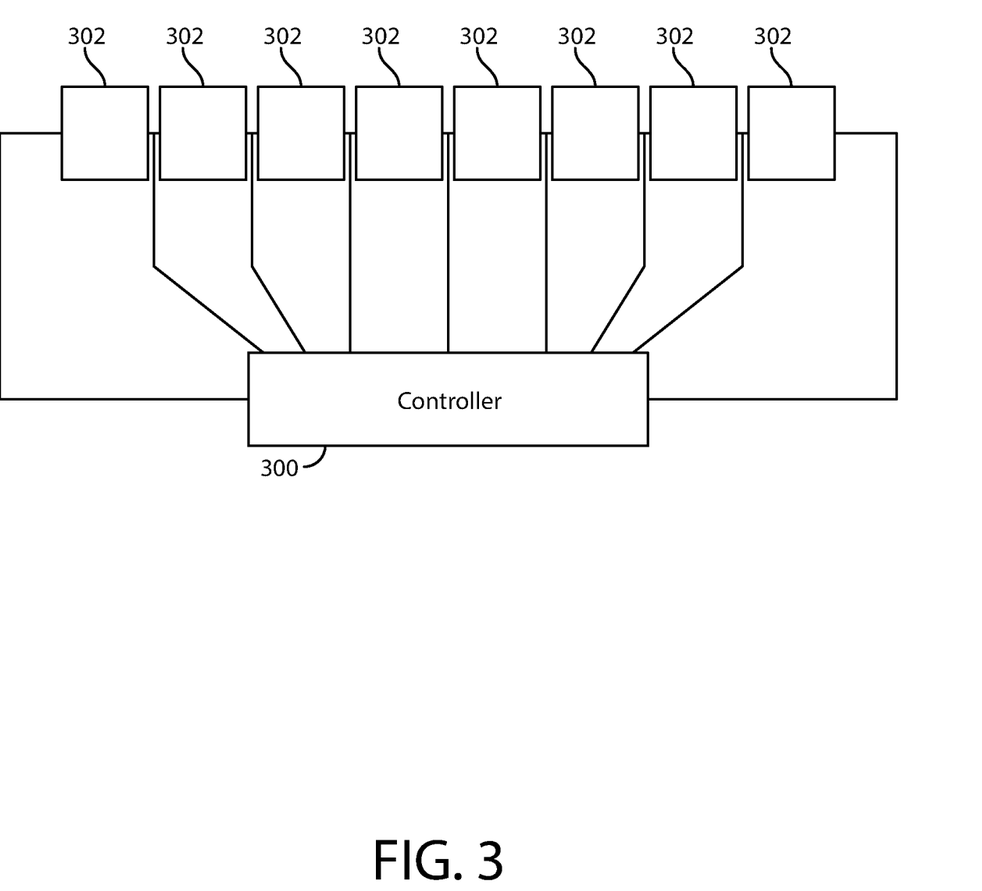
FIG. 3 is a functional block diagram of one embodiment of a person detector as shown in FIG. 2, in this embodiment, a linear thermopile.

Second person sensor 206 is used in some embodiments in conjunction with first person sensor 204. In these embodiments, second person sensor 204 may be specially configured to detect the presence of a person in an area being monitored by PDD 102, as opposed to detecting movement of a person in the area, which is performed by first person detector 204. In one embodiment, second person sensor 206 comprises a limited thermopile array. Thermopiles are electronic devices that convert thermal energy into electrical energy. Typically, a number of thermopile "elements", i.e., thermocouples, are arranged as an X by X grid to detect changes in temperature in a field of view of second person sensor 206. Panasonic's popular version, the Grid-EYE, consists of 64 MEMS thermopile elements arranged in an 8×8 grid on a single detector chip. Thermopiles consume relatively large amounts of energy so, in battery-powered applications such as PDD 102, any sizeable grid arrangement is generally not feasible. However, as shown in FIG. 3, second person sensor 206 comprises a limited, 1 by X linear array where, in this example, X=8. Controller 300 is controlled by processor 200 and is configured to measure voltages generated by each thermal element 302 when heat is detected, such as when a person enters, or remains, in a room.

Transceiver 206 is coupled to processor 200 and comprises circuitry necessary to transmit and receive wireless signals from security controller 104, local-area network 806 and/or home automation hub 106. Such circuitry is well known in the art and may comprise BlueTooth, Wi-Fi, Z-wave, Zigbee, X-10, RF, optical, or ultrasonic circuitry, among others.

Figure 4:
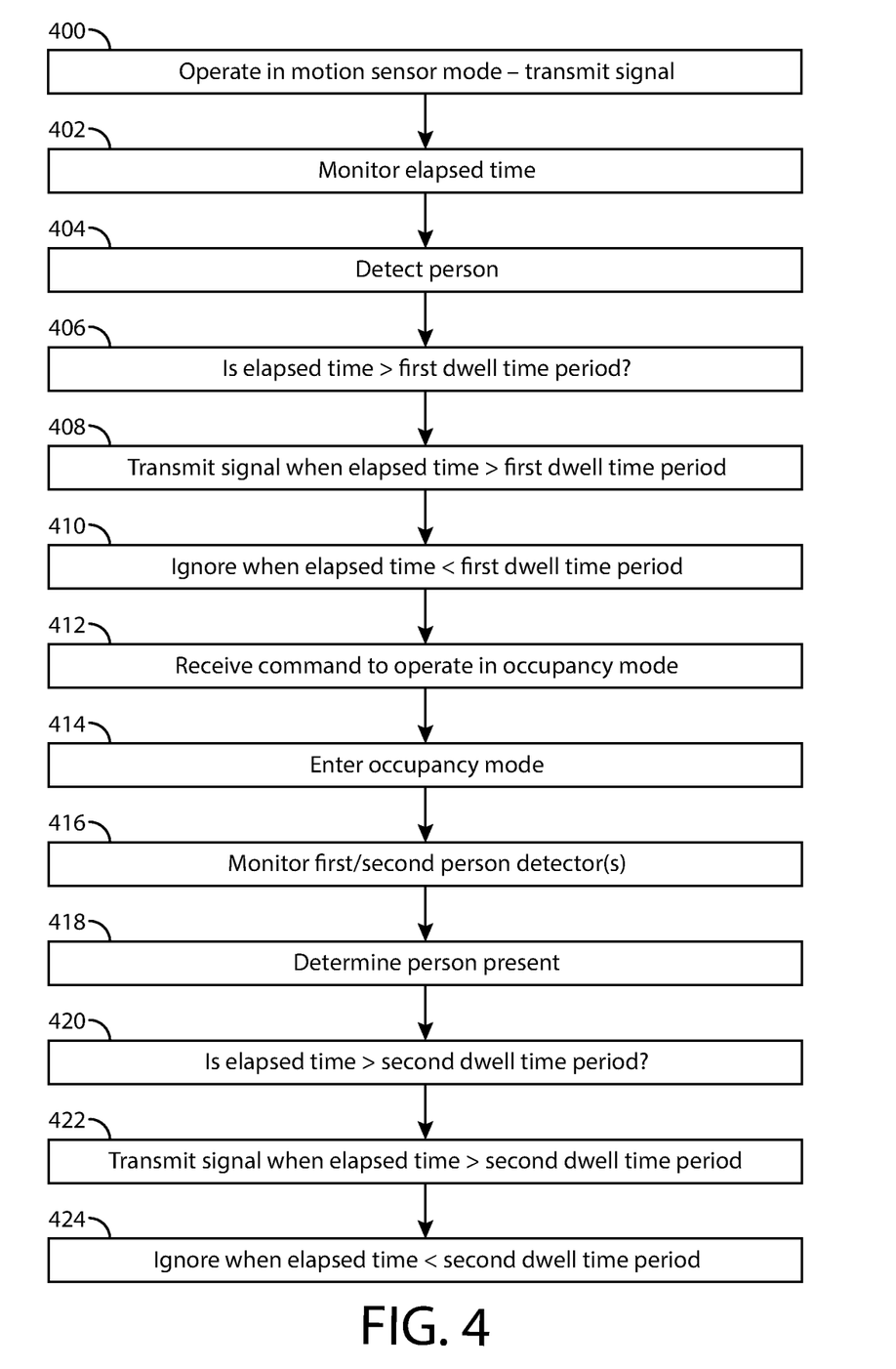
FIG. 4 is a flow diagram illustrating one embodiment of a method for detecting motion and occupancy of a person in an area.

FIG. 4 is a flow diagram illustrating one embodiment of method, or algorithm, performed by PDD 102 for detecting motion in an area monitored by PDD 102 while operating in a motion-detection mode of operation, and for detecting occupancy of a person in the area monitored by PDD 102 while operating in an occupancy sensing mode of operation. It should be understood that in some embodiments, not all of the steps shown in FIG. 4 are performed and that the order in which the steps are carried out may be different in other embodiments. It should be further understood that some minor method steps have been omitted for purposes of clarity.

The process begins at block 400, where PDD 102 is operating in a motion-detection mode, and security controller 104 is operating in an armed-away state, i.e., security controller 104 taking one or more actions, such as causing a loud, local siren in premises 100 to sound, and/or contacting a remote monitoring facility for further action, when it receives a motion-detected signal, person-present signal, or any other signal indicative of a security breach of premises 100, such as receipt of a signal from any one of a plurality of door/window sensors that monitor doors and windows of premises 100. The armed-away mode is typically activated by a user of security controller 104 when the user is leaving premises 100, and no one else is inside premises 100.

In the motion-detection mode of operation, processor 200 monitors first person detector 204 to determine when a person is moving across a field of view of PDD 102, typically a view of 135 degrees. In this embodiment, first person detector 204 is a PIR sensor, and processor 300 monitors the PIR sensor for changes in its output signal when a moving person is detected. When the output from the PIR crosses a predetermined threshold stored in memory 202, processor 300 determines that a person is present and causes transceiver 208 to transmit a "person-present" signal or a "motion-detected" signal, indicative of processor 300 determining that motion has occurred, caused by a human, in the area being monitored by PDD 102. The person-present signal may be generated by processor 200 and formatted so that each of security controller 104 and home automation hub 106 may each receive the person-present signal, based on a common communication protocol used by both security controller 104 and home automation hub 106. In another embodiment, only a "motion-detected" signal is transmitted to security controller 104, and security controller 104 processes the motion-detected signal as it ordinarily would, i.e., by taking one or more actions, such as causing a loud, local siren in premises 100 to sound, and/or contacting a remote monitoring facility for further action, when security controller is operating in an armed-away mode of operation or an armed-home mode of operation (in the former, security controller 104 takes the one or more actions when it receives the motion-detected signal, person-present signal, or any other signal indicative of a security breach of premises 100, such as receipt of a signal from any one of a plurality of door/window sensors that monitor doors and windows of premises 100), while in the latter, security controller 104 takes the one or more actions when it receives signals indicative of a breach of premises 100, but not when it receives a person-present signal or motion-detected signal). if a person addressed exclusively to security controller 104 in accordance with a communication protocol used by security controller 104.

At block 402, after processor 200 has caused transceiver 208 to transmit either the person-present signal or motion-detected signal, processor 200 begins monitoring an elapsed time from when the signal was transmitted (or, alternatively, when the person was detected).

At block 404, processor 200 determines that either the same person, or another person, is present in the area monitored by PDD 102, by determining that movement was detected, as explained above.

At block 406, prior to transmitting a person-present signal or motion-detected signal, processor 300 determines if the elapsed time since determination/transmission of the previous person-present signal or motion-detected signal is greater than a dwell time stored in memory 202. The dwell time is pre-programmed into PDD 102 and is equal to a time period selected by the designer of PDD 102 in order to prevent PDD 102 from transmitting a person-present signal or motion-detected signal every time that movement is detected, as people often move around in the area being monitored by PDD 102, and one transmission is enough to alert security controller of the presence of a person. Setting this "dwell time period" to between about 3 and 6 minutes prevents numerous, back-to-back transmissions. In a sense, PDD 102 is reset, or re-enabled to transmit the person-present signal or motion-detected signal each dwell time period after transmitting a person-present signal or motion-detected signal.

At block 408, when processor 200 determines that the elapsed time exceeds the dwell time period, processor 200 causes transceiver 208 to transmit the person-present signal or the motion-detected signal.

At block 410, when processor 200 determines that the elapsed time does not exceed the dwell time period, processor 200 either ignores the determination and continues to monitor the first person sensor 204 or waits until the elapsed time is greater than the dwell time period before causing a person-present signal or a motion-detected signal to be transmitted by transceiver 208.

At some point in time, when a user of security controller 104 returns to his or her home or business, the user places security controller 104 into either an armed-home mode of operation or an "off" or unmonitored mode of operation. In the off or unmonitored mode, security controller 104 takes no actions when it receives signals from PDD 102 or from other security devices such as door/window sensors, glassbreak sensors, etc. In response to entering the armed-home mode or the off mode, security controller 104 transmits a command to change the operating mode of PDD 102 to an occupancy mode of operation. The command may include a new dwell time, or a new dwell time may be transmitted in a separate message or command. In another embodiment, a new dwell time is not provided to PDD 102 b security controller 104, but already pre-stored in memory 202.

At block 412, processor 200 receives the command to change the operating mode of PDD 102 to the occupancy mode of operation via transceiver 208. If the command comprises a new dwell time period, processor 200 stores it in memory 202.

At block 414, in response to receiving the command, processor 200 causes PDD 102 to enter into the occupancy mode of operation as follows.

At block 416, processor 200 continues to monitor first person detector 204 to determine when a person is moving across a field of view of PDD 102. In one embodiment, rather than monitoring first person detector 204, processor 200 begins monitoring second person detector 204. Second person detector 204, in one embodiment, comprises a linear thermopile array, as described earlier. In this embodiment, processor 200 monitors the voltage produced by one or more elements of the linear thermopile array to determine if a thermal threshold has been reached with respect to one or more of the elements, indicating that a person is present in the area being monitored by PDD 102. When the output of one or more of the elements of the linear thermopile array exceeds one or more predetermined thresholds stored in memory 202, processor 200 determines that a person is present, and that the area is occupied.

In one embodiment, processor 200 monitors a very small number of elements, such as between 1 element and 5 elements, to determine a likelihood that a person is present. This allows PDD 102 to save battery life, as only a small subset of elements is actively monitored. In this embodiment, if one or more of the subset of elements indicates the possible presence of a person, processor 200 may begin monitoring all of the elements, in one embodiment, at predetermined time intervals, to get a better understanding of whether someone is actually present, and potentially the number of persons in the field of view of PDD 102.

In another embodiment, after receipt of the command to place PDD 102 into the occupancy mode of operation, processor 200 continues to monitor first person detector 204 while second person detector 206 remains unpowered or in a low-power consumption state, until processor 200 determines that a person is moving in the area being monitored by PDD 102. In response, processor 200 enables or energizes at least a portion of second person detector 206 and begins monitoring the output of second person detector 206, in some embodiments, at predetermined time periods such as once per 30 seconds or once per minute, or something on the order between a few seconds to something less than 5 minutes, in order to determine if the person remains present in the area monitored by PDD 102. At this point, processor 200 may stop monitoring first person detector 204. Processor 200 may continue to monitor second person detector 206, in one embodiment at predetermined time intervals, for a predetermined time period after processor 200 no longer detects the presence of a person via second person detector 206. Processor 200 may transmit person-present or "occupied" signals to home automation hub each time that processor 200 determines that a person is present using second person detector 206, or processor 200 may only transmit a "person not present" or "unoccupied" signal to home automation hub 106 after processor 200 determines that a person is no longer in the area, based on signals received from second person detector 200. At that point, processor 200 may place second person detector 206 back into the low or no-power state and continue to monitor first person detector 204. In this way, home automation hub 106 can intelligently control various devices or systems in premises 100 based on the occupancy status as reported by PDD 102 in the occupancy mode of operation. For example, by determining the occupancy status by processor 200 every minute, after being alerted by first person detector 204 that a person moved in the area proximate to PDD 102, home automation hub 106 can keep lights on in a room where PDD 102 is located and shut them off automatically when PDD 102 indicates that a person is no longer present, using second person detector 206.

In any case, at block 418, processor determines that a person is present in the area being monitored by PDD 102.

At block 420, processor 200 compares the elapsed time since the last time that processor 200 determined that a person was moving, or present, as the case may be, to the new dwell time period stored in memory 202. The new dwell time period is typically shorter than the dwell time period that is used for elapsed time comparisons while PDD 102 is in the motion sensor mode of operation.

At block 422, when processor 200 determines that the elapsed time exceeds the new dwell time period, processor 200 causes transceiver 208 to transmit the person-present signal to either security controller 104, home automation hub 106, or both, as described above.

At block 424, when processor 200 determines that the elapsed time does not exceed the new dwell time period, processor 200 either ignores the determination and continues to monitor the first and/or second person sensor or waits until the elapsed time is greater than the new dwell time period before causing a person-present signal to be transmitted by transceiver 208.

At some time later, the user places security controller 104 back into the armed-away mode, where security controller 104 transmits a command to PDD 102 to place PDD 102 back into the motion sensor mode of operation. In response, processor 200 begins monitoring first person sensor 204 and compares subsequent elapsed times to the dwell time period associated with the motion sensor mode of operation.

Therefore, having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A method performed by a person detection device (PDD), comprising:
    operating, by a processor of the PDD, in a motion sensor mode of operation during a first time period, wherein operating in the motion sensor mode comprises transmitting a motion present signal at an expiration of a first dwell time any time motion is detected by the PDD; and
    operating, by the processor, in an occupancy mode of operation during a second time period, wherein operating in the occupancy mode comprises transmitting a person-present signal at an expiration of a second dwell time any time occupancy is detected by the PDD;

wherein, in the occupancy mode of operation, the PDD does not monitor for movement of a person.

2. The method of claim 1, wherein the first dwell time comprises a first predetermined time period after the processor detects that a person is present in the area.

3. The method of claim 1, wherein a same, single sensor is used in the motion sensor mode and the occupancy mode.

4. The method of claim 1, wherein the second dwell time comprises a first predetermined time period after the processor detects that a person is present in the area.

5. The method of claim 1, wherein configuring the PDD to operate in the occupancy mode of operation comprises:
comparing, by the processor, an elapsed time from when a first person was detected by the processor to a previous time when the first person was detected to the second dwell time, the second dwell time shorter in duration than the first dwell time.

6. The method of claim 5, wherein configuring the PDD to operate in the occupancy mode of operation comprises:
receiving, by the processor via a receiver coupled to the processor, a command instructing the PDD to enter the occupancy mode of operation, the command comprising the second dwell time;
storing, by the processor, the second dwell time in a memory coupled to the processor; and
comparing, by the processor, the elapsed time to the second dwell time when the first person is detected.

7. The method of claim 6, wherein the command comprises an indication of a security system operating mode, and the processor determines whether to enter the occupancy mode of operation based on the operating mode of the security system.

8. The method of claim 1, wherein operating the PDD in the occupancy sensor mode of operation comprises:
monitoring, by the processor, a first person sensor while keeping a second person sensor in a low-power state;
determining, by the processor via the first person sensor, that a person is present in an area being monitored by the PDD;
enabling, by the processor, a second person sensor; and
monitoring, by the processor, the second person sensor to determine that the person remains present in the area.

9. The method of claim 1, wherein operating the PDD in the occupancy sensor mode of operation comprises:
monitoring, by the processor, a subset of thermal elements of a thermal detection device;
determining, by the processor, a possibility that a person is in an area being monitored by the PDD as a result of monitoring the subset of thermal elements;
in response to determining a possibility that a person is in the area, monitoring, by the processor, all of the thermal elements; and
determining, by the processor, that a person is in the area based on monitoring all of the thermal elements.

10. A person detection device (PDD) for detecting motion and occupancy of a person in an area, comprising:
a memory for storing processor-executable instructions;
a transceiver for sending and receiving wireless signals;
a processer coupled to the detector, the memory and the transceiver, for executing the processor-executable instructions that causes the apparatus to:
operate, by the processor, during a first time period, the PDD in a motion sensor mode of operation wherein the PDD uses the transceiver to transmit, at an expiration of a first dwell time, a motion present signal in response to any motion being detected by the PDD; and
operate, by the processor, during a second time period, the PDD in an occupancy mode of operation wherein the PDD uses the transceiver to transmit, at an expiration of a second dwell time, a person-present signal in response to any occupancy being detected by the PDD;
wherein, in the occupancy mode of operation, the PDD does not monitor for movement of a person.

11. The PDD of claim 10, wherein the first dwell time comprises a first predetermined time period after the processor detects that a person is present in the area.

12. The PDD of claim 10, wherein a same, single sensor is used in the motion sensor mode and the occupancy mode.

13. The PDD of claim 10, wherein the second dwell time comprises a first predetermined time period after the processor detects that a person is present in the area.

14. The method of claim 10, wherein the processor-executable instructions for causing the PDD to operate in the occupancy mode of operation comprises further processor-executable instructions that causes the PDD to:
compare, by the processor, an elapsed time from when a first person was detected by the processor to a previous time when the first person was detected to the second dwell time, the second dwell time shorter in duration than the first dwell time.

15. The method of claim 10, wherein the processor-executable instructions for causing the PDD to operate in the occupancy mode of operation comprises further processor-executable instructions that causes the PDD to:
receive, by the processor via the transceiver, a command instructing the PDD to enter the occupancy mode of operation, the command comprising the second dwell time;
store, by the processor, the second dwell time in the memory coupled to the processor; and
compare, by the processor, the elapsed time to the first dwell time when the first person is detected.

16. The PDD of claim 15, wherein the command comprises an indication of a security system operating mode, and the processor-executable instructions for determining whether to enter the occupancy mode of operation comprises additional processor-executable instructions that causes the PDD to:
determine, by the processor, whether to enter the occupancy mode of operation based on the operating mode of the security system.

17. The PDD of claim 10, further comprising:
a first person sensor coupled to the processor; and
a second person sensor coupled to the processor;
wherein the processor-executable instructions that causes the PDD to operate in the occupancy mode of operation comprises additional processor-executable instructions that causes the PDD to:
monitor, by the processor, the first person sensor while keeping a second person sensor in a low-power state;
determine, by the processor via the first person sensor, that a person is present in an area being monitored by the PDD;
enable, by the processor, the second person sensor; and
monitor, by the processor, the second person sensor to determine that the person remains present in the area.

18. The method of claim 10, further comprising:
a thermal detection device coupled to the processor, the thermal detection device comprising a subset of thermal elements;

wherein the processor-executable instructions that causes the PDD to operate in the PDD mode of operation comprises further processor-executable instructions that causes the PDD to:

monitor, by the processor, the subset of thermal elements of the thermal detection device;

determine, by the processor, a possibility that a person is in an area being monitored by the PDD as a result of monitoring the subset of thermal elements;

in response to determining a possibility that a person is in the area, monitor, by the processor, all of the thermal elements; and determine, by the processor, that a person is in the area based on monitoring all of the thermal elements.

\* \* \* \* \*